(12) United States Patent
Araki (10) Patent No.: US 6,524,731 B1
(45) Date of Patent: *Feb. 25, 2003

(54) CORROSION-RESISTANT MEMBER AND METHOD OF PRODUCING THE SAME

(75) Inventor: Kiyoshi Araki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 89 days.

This patent is subject to a terminal disclaimer.

(21) Appl. No.: 09/669,473

(22) Filed: Sep. 25, 2000

(30) Foreign Application Priority Data

Sep. 30, 1999 (JP) .............................. 11-277751

(51) Int. Cl.[7] .............................. B32B 9/04; B32B 15/20
(52) U.S. Cl. ..................... 428/696; 428/698; 428/699; 428/702; 428/336; 428/704
(58) Field of Search ................................ 428/696, 698, 428/699, 702, 704, 332, 336

(56) References Cited

U.S. PATENT DOCUMENTS

| | | | |
|---|---|---|---|
| 5,306,895 A | | 4/1994 | Ushikoshi et al. |
| 5,541,145 A | * | 7/1996 | Harris et al. ................ 428/698 |
| 5,786,094 A | * | 7/1998 | Kiuchi et al. ................ 428/432 |
| 6,027,792 A | | 2/2000 | Yamamoto et al. |
| 6,139,983 A | * | 10/2000 | Ohashi et al. ............... 118/726 |
| 6,406,799 B1 | * | 6/2002 | Aihara et al. |
| 6,416,889 B2 | * | 7/2002 | Aihara et al. |

FOREIGN PATENT DOCUMENTS

| | | |
|---|---|---|
| EP | 0 702 098 A1 | 3/1996 |
| EP | 0 891 957 A1 | 1/1999 |
| EP | 0 939 067 A1 | 9/1999 |
| JP | 7-273053 | 10/1995 |
| JP | 9-326384 | 12/1997 |

OTHER PUBLICATIONS

JP 09 328382 "Aluminum Nitride Base Material for Semiconductor Production Unit and Its Production", S. Kunio, Dec. 22, 1997 (Abstract).

* cited by examiner

Primary Examiner—Deborah Jones
Assistant Examiner—Jennifer McNeil
(74) Attorney, Agent, or Firm—Burr & Brown (57) ABSTRACT

A corrosion-resistant member includes a substrate made of an aluminum-containing ceramic material and an aluminum fluorine containing film which coats at least a part of a surface of the substrate. The aluminum fluorine-containing film, which is formed by directly contacting the substrate with a fluorine-containing compound, has a thickness of 0.01–5.0 μm. The substrate contains silicon in an amount of not more than 0.5% by weight when calculated as silicon dioxide. Thereby, changes in weight due to corrosion can be decreased and generation of particles can be further controlled upon exposure to a corrosive halogen gas.

5 Claims, 5 Drawing Sheets

CORROSION-RESISTANT MEMBER AND METHOD OF PRODUCING THE SAME

BACKGROUND OF THE INVENTION

1. Field of the Invention

This invention relates to a corrosion-resistant member provided with a fluorine-containing film and to a method of producing the member.

2. Description of Related Art

It has been known that corrosion-resistance of ceramics or metals against a halogen gas or its plasma is improved by forming a fluoride film, particularly an aluminum fluoride film thereon. U.S. Pat. No. 5,306,895 teaches that a aluminum trifluoride film is formed on a surface of an aluminum nitride or an alumina.

JP-A-7-273053 teaches that a surface of an aluminum member exposed to an atmosphere in a treating chamber is previously coated by replacing with fluorine. Concretely, a film of aluminum trifluoride is formed on the surface of the aluminum-based member made of alumina or aluminum nitride by introducing hydrogen fluoride, nitrogen fluoride or chlorine fluoride at 300° C. thereinto.

JP-A-9-326384 teaches that in a plasma-treating apparatus a part of a surface of a member which is exposed to plasma is coated with a fluoride film composed mainly of aluminum. Concretely, anodized aluminum, aluminum nitride or sapphire is fluorinated to generate an aluminum trifluoride thereon. In fluorinating, at first a fluorine gas is diluted to 20–50% with nitrogen gas and the resulting atmosphere gas is pylorized at 150–400° C. Then, in the atmosphere a sample is fluorinated by heating it to 400° C. for two hours. Thereby, generation of particles is restrained in the treating apparatus during the plasma treating.

SUMMARY OF THE INVENTION

The inventor has made strenuous studies to give a substrate such as aluminum nitride, alumina or the like a good corrosion-resistance and to diminish generation of particles during the plasma treatment. As a result of the study, the inventor has found that merely forming a fluorine-containing film on a surface of a ceramic, such as aluminum nitride or the like, by fluorinating the surface does not highly suppress the generation of the particles. Namely, the inventor has fluorinated many substrates, which were made of aluminum nitride or alumina ceramic commercially available, by using a fluorine gas to form the fluoride-containing films thereon. However, when the resulting substrates were exposed to a cleaning gas, an etching gas or the like at high temperatures in a semiconductor-manufacturing apparatus, the generation of particles could not highly be controlled, though some degree of corrosion-resistance could be attained by the fluoride-containing film.

It is, therefore, an object of the invention to provide a corrosion-resistant member comprising a ceramic substrate and a fluorine-containing film which coats at least a part of a surface of the substrate, which has reduced a change in weight due to corrosion and at the same time a further controlled generation of particles when exposed to a corrosive halogen gas.

According to a first aspect of the invention, there is the provision of a corrosion-resistant member including a ceramic substrate and a fluorine-containing film which coats at least a part of a surface of the substrate, in which the fluorine-containing film is formed by directly contacting the substrate with a fluorine-containing compound and has a thickness of 0.01–5.0 μm and the substrate contains silicon in an amount of not more than 0.5% by weight when calculated as silicon dioxide.

The inventor has found that when the fluorine-containing film is formed by directly contacting the substrate with the fluorine-containing compound and the substrate is exposed to a corrosive halogen gas or its plasma, an amount of the generated particles largely depends on the silicon content contained in the ceramic substrate, and accomplished the present invention.

Concretely, the amount of the generated particles is extremely decreased by limiting the content of silicon in the substrate to not more than 0.5% by weight when calculated as silicon dioxide. The reason is not clear but is considered as follows.

It is considered that when the ceramic is contacted with a fluorine gas at a high temperature, the silicon existing in the ceramic reacts with the fluorine to form silicon tetrafluoride. Silicon tetrafluoride evaporates to become a gas at the high temperature. For this reason, it is considered that when the amount of silicon in the ceramic is high, a fluorine-containing film is difficult to form, or even if the fluoride film is formed, the film is difficult to adhere to the surface of the ceramic substrate or the quality of the film is bad. As a result, when the resulting corrosion-resistant member is exposed to the corrosive halogen gas or its plasma, peeling of a part of the film is seen to lead to generation of particles.

In the present invention, the term "a fluorine-containing film" means a film which contains fluorine in any form. The fluorine-containing film may contain nitrogen, carbon. oxygen and unavoidable impurities other than a metal element in the ceramic. The fluorine-containing film may be a film made of a fluorine-containing compound. The term "a fluorine-containing compound" means a compound which contains a fluorine atom in a stoichiometric amount and involves a fluoride of a metal such as aluminum fluoride or the like.

The thickness of the fluorine-containing film is limited to 0.01–5.0 μm, which is important. When it is not less than 0.01 μm, the corrosion-resistance of the substrate can be ensured. From the point of view, it is preferably not less than 0.05 μm.

The thickness of the fluorine-containing film is limited to not more than 5.0 μm, thereby, when the corrosion-resistant member is exposed to a corrosive halogen gas, the generation of particles which is caused by the peeling off of the fluorine-containing film can be avoided. From this point of view, the thickness of the fluorine-containing film is preferably not more than 3.0 μm.

For the purpose of further controlling generation of particles, the amount of silicon contained in the ceramic is preferably not more than 0.2% by weight.

The kind of the ceramic material is not particularly limited, and oxide or nitride of at least one metal selected from the group consisting of aluminum, rare earth element and alkali earth metal is preferred. Alternatively, it is preferably of double oxide or double nitride of at least two metals selected from the above-mentioned group.

The ceramic material is preferably double oxide or double nitride of aluminum and at least one of rare earth elements. In this case, since the rare earth element is also fluorinated, the resulting fluorine-containing film contains aluminum fluoride and fluoride of the rare earth element. As such a rare earth element, yttrium, ytterbium and cerium are preferable, and among them yttrium is particularly preferable.

Alternatively, the ceramic material is preferably double oxide or double nitride of aluminum and at least one of alkaline earth metals. In this case, since the alkaline earth metal is also fluorinated, the resulting fluorine-containing film contains aluminum fluoride and fluoride of the alkaline earth metal. As such an alkaline earth metal, magnesium is particularly preferable.

Particularly, the ceramic material is preferably alumina or aluminum nitride and the fluorine-containing film is preferably made of fluoride of aluminum.

Further, among oxides and nitrides of alkaline earth metals, the oxides are preferable and magnesia is particularly preferable.

Further, among oxides and nitrides of rare earth elements, the oxides are preferable. Particularly, yttria, ytterbium oxide and ceria are preferable, and yttria is particularly preferable.

A method of producing the corrosion-resistant member in the present invention is not particularly limited. As a suitable method, the following will be illustrated.

Namely, at first the ceramic substrate is prepared which contains silicon of in an amount of not more than 0.5% by weight when calculated as silicon dioxide, and then the substrate is heat-treated in an atmosphere which contains a fluorine gas of not less than 60% by volume to form the fluorine-containing film. In this case, the atmosphere preferably substantially consists of the fluorine gas. Besides, the atmosphere may contain unavoidable impurities.

The reaction is preferably conducted at a temperature range of 300–500° C., and a partial pressure of fluorine gas is preferably 0.5–2.0 atm. The reaction time is not limited and commonly 1–10 hours.

The above-mentioned method is particularly useful for manufacturing the corrosion-resistant member in the present invention on account of the following reason. Namely, when a ceramic substrate is exposed to the fluorine gas at a high concentration, if an amount of silicon contained in the substrate exceeds 0.5% by weight when calculated as silicon dioxide, the surface of the substrate is rough because of the above-mentioned reason and formation of a high quality of the fluorine-containing film is difficult. In the producing method of the present invention, when the ceramic substrate is exposed to a fluorine gas at the high concentration, since the silicon concentration in the substrate is limited to not more than 0.5% by weight when calculated as silicon dioxide, a high quality of a fluorine-containing film can be obtained. Thereby, the amount of the particles can be decreased when the corrosion-resistant member is exposed to the corrosive halogen gas or its plasma.

Moreover, it is preferable that before the fluorinating treatment, the substrate is heat-treated in an inert atmosphere at temperatures between 100–500° C. to remove a moisture on the surface of the substrate.

Further, after the fluorinating treatment, the substrate is heat-treated in the inert atmosphere at temperatures of 100–500° C. or in air at 100–400° C., thereby the fluorine-containing film can be stabilized.

The fluorinating treatment is preferably conducted by placing the ceramic substrate in a chamber, an inner surface of which is plated with Ni—P, and introducing the fluorine gas into the chamber. It is disclosed in JP-A-9-326384 that a Ni—P-plated chamber has a high corrosion-resistance against the fluorine gas.

Applications of the corrosion-resistant member in the present invention are not limited. Preferably, the members can be used as members at least partially contacting with the corrosive gas in a treating apparatus, for example a chemical vapor deposition apparatus, such as a semiconductor-manufacturing apparatus, a flat panel display apparatus, a hard disc-manufacturing apparatus or the like. As such a corrosive halogen gas, mention may be made of a cleaning gas such as $ClF_3$, $NF_3$, $CF_4$, HF, HCl, $Cl_2$, $C_xF_y$ or the like, an etching gas, and a film-forming gas such as $WF_6$ or the like.

As a concrete example of the corrosion-resistant member, mention may be made of a susceptor generating heat by heating with an infrared lamp, a ceramic heater, a susceptor placed on a heating surface of the ceramic heater, a susceptor embedding an electrode for electrostatic chuck therein, a susceptor embedding an electrode for electrostatic chuck and a heating resistor therein, a susceptor embedding an electrode for generating a high frequency plasma, a susceptor embedding an electrode for generating a high frequency plasma and a heating resistor therein and a shower plate.

In an apparatus for generating an excimer laser such as an excimer laser of KrF, ArF, or $F_2$, a flange tube made of the corrosion-resistant member can be used for providing the fluorine gas or fluorine compound gas. In a luminescent lamp such as a metal halide lamp or the like, the member can be used for a corrosion-resistant member for a luminescent tube enclosing a metal halide.

BRIEF DESCRIPTION OF THE DRAWINGS

The invention will be described with reference to the accompanying drawings, wherein.

DETAILED DESCRIPTION OF THE INVENTION

The following examples are given in order to illustrate the present invention and are not intended for limiting it.

EXAMPLE 1

At first an alumina sintered body was manufactured which contained silicon as an impurity in an amount of 730 ppm (0.073% by weight) when calculated as silicon dioxide. And then, from the sintered body an specimen having a size of 10 mm×10 mm×2 mm was cut out. Subsequently, a surface of the specimen was mirror-finished to a mirror surface having an center-line mean surface roughness Ra of about 0.02 μm. The specimen was used for the following analysis.

The specimen was placed in a Ni—P plated chamber into which a nitrogen gas was introduced, and baked at a temperature of 500° C. Then the temperature in the chamber was decreased to 400° C. and 100% of a $F_2$ gas (at 1 atm) was introduced into the chamber, then the specimen was heat-treated for 5 hours therein. After the heat-treatment, the nitrogen gas was introduced into the chamber while keeping the temperature of 400° C., and the specimen was subjected to a. stabilizing treatment for 4 hours therein. Then, the temperature of the chamber was lowered to room temperature, and subsequently the specimen was taken out and washed and dried.

Figure 5:
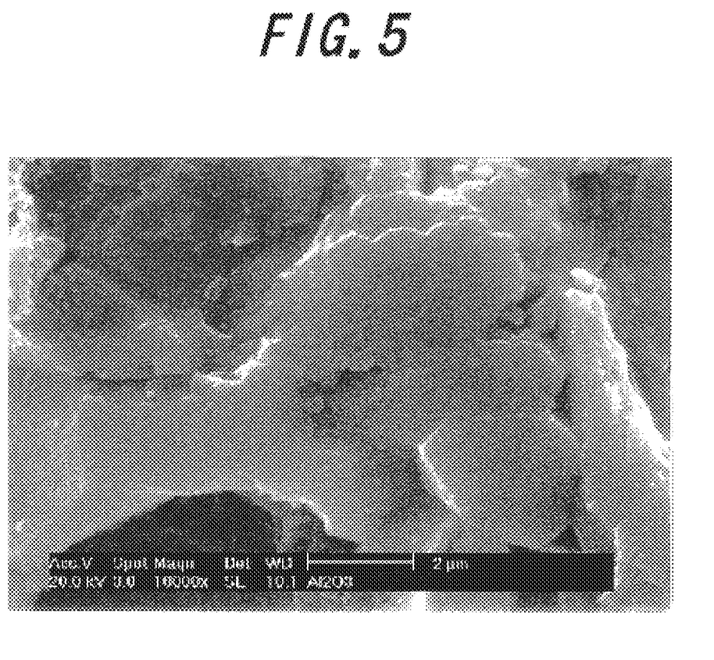
FIG. 5 is a scanning electron microscope photograph showing a state of the surface of the specimen in Example 1 according to the present invention.
Figure 6:
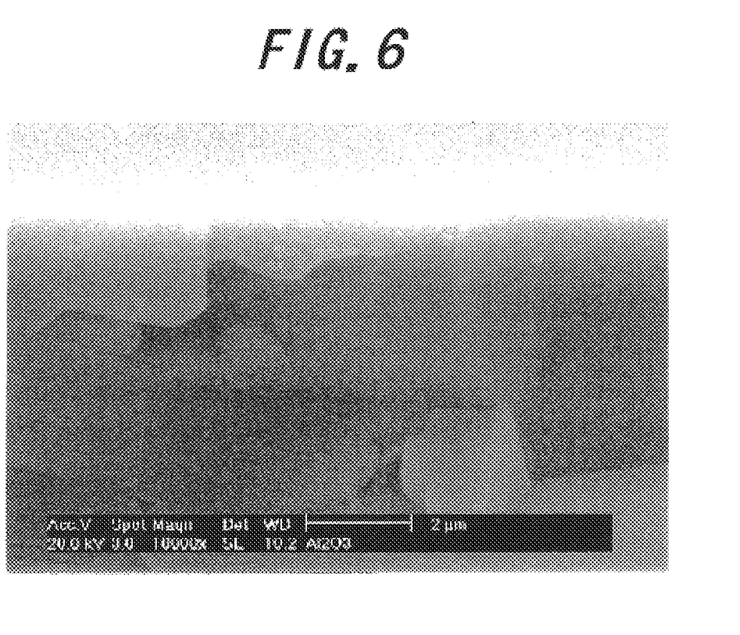
FIG. 6 is a scanning electron microscope photograph showing a cross section of the specimen in Example 1 according to the present invention.

As shown in FIG. 5, a cloudy form was observed on the surface of the specimen by means of a scanning electron microscope. Further, as shown in FIG. 6, when a cross section was observed, a surface film was not seen clearly on the surface of the specimen (10000×magnification).

Figure 1:
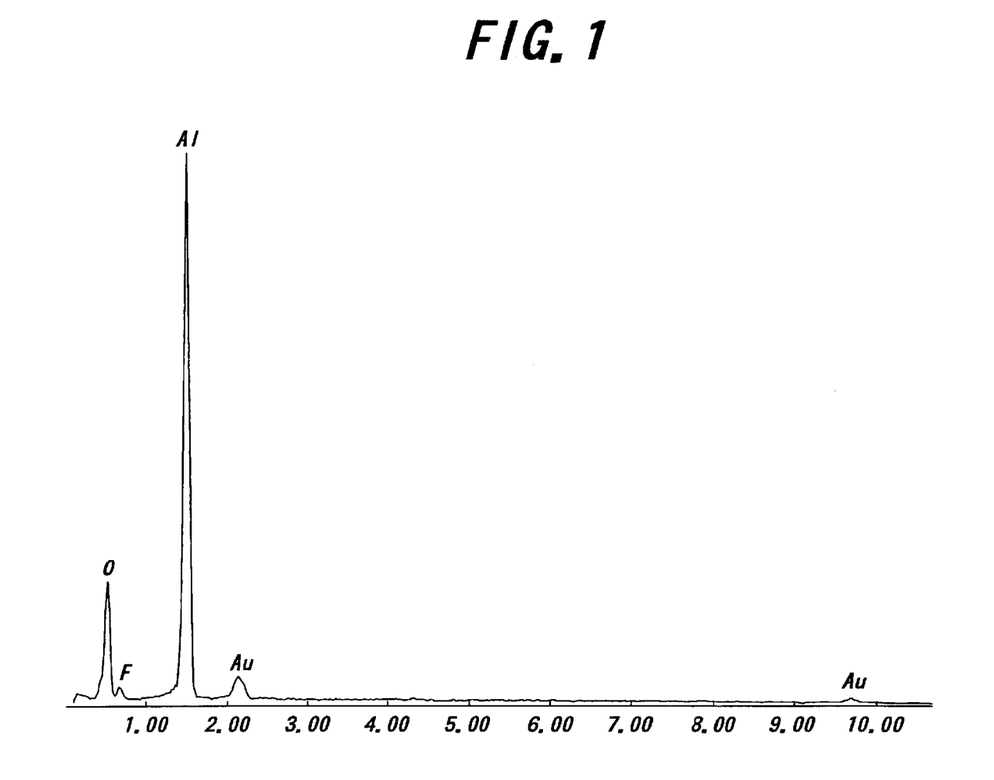
FIG. 1 is a chart showing a result of analyzing a surface of a specimen in Example 1 according to the present invention by means of an EDS attached to a scanning electron microscope.

By analyzing the surface of the specimen with an EDS attached to the scanning electron microscope, a peak of fluorine was seen as shown in FIG. 1.

Figure 2:
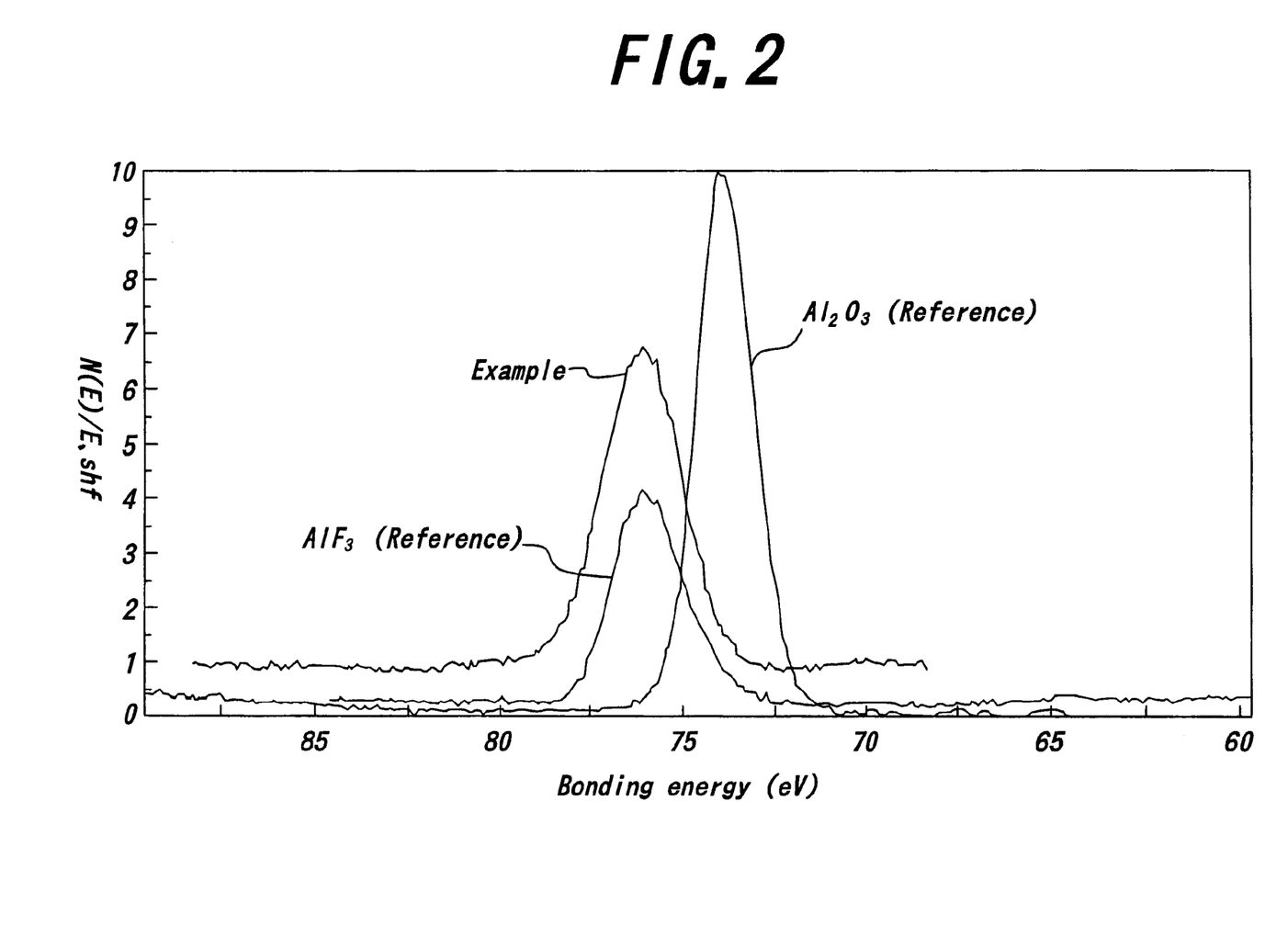
FIG. 2 is a chart showing a result of observing a state spectrum of $Ai_{2p}$ on the surface of the specimen in Example 1 according to the present invention by means of an XPS.

FIG. 2 shows a chemical state spectrum of $Al_{2p}$ on the surface of the specimen with an XPS (X-ray photoelectron spectrometry). Besides, in the FIG. 2 "$AlF_3$ (reference)" shows data of $AlF_3$ powder and "$Al_2O_3$ (reference)" shows data of an alumina sintered body and "Example" shows data of the aforementioned specimen. In the FIG. 2 an abscissa axis is a bonding energy and an ordinate axis is a peak intensity (arbitrary scale). In the FIG. 2 it is found that a peak shift value of the Example is apart from that of alumina and near to aluminum trifluoride powder. From the peak shift, it is considered that the aluminum element exists not as alumina but as aluminum trifluoride.

Figure 3:
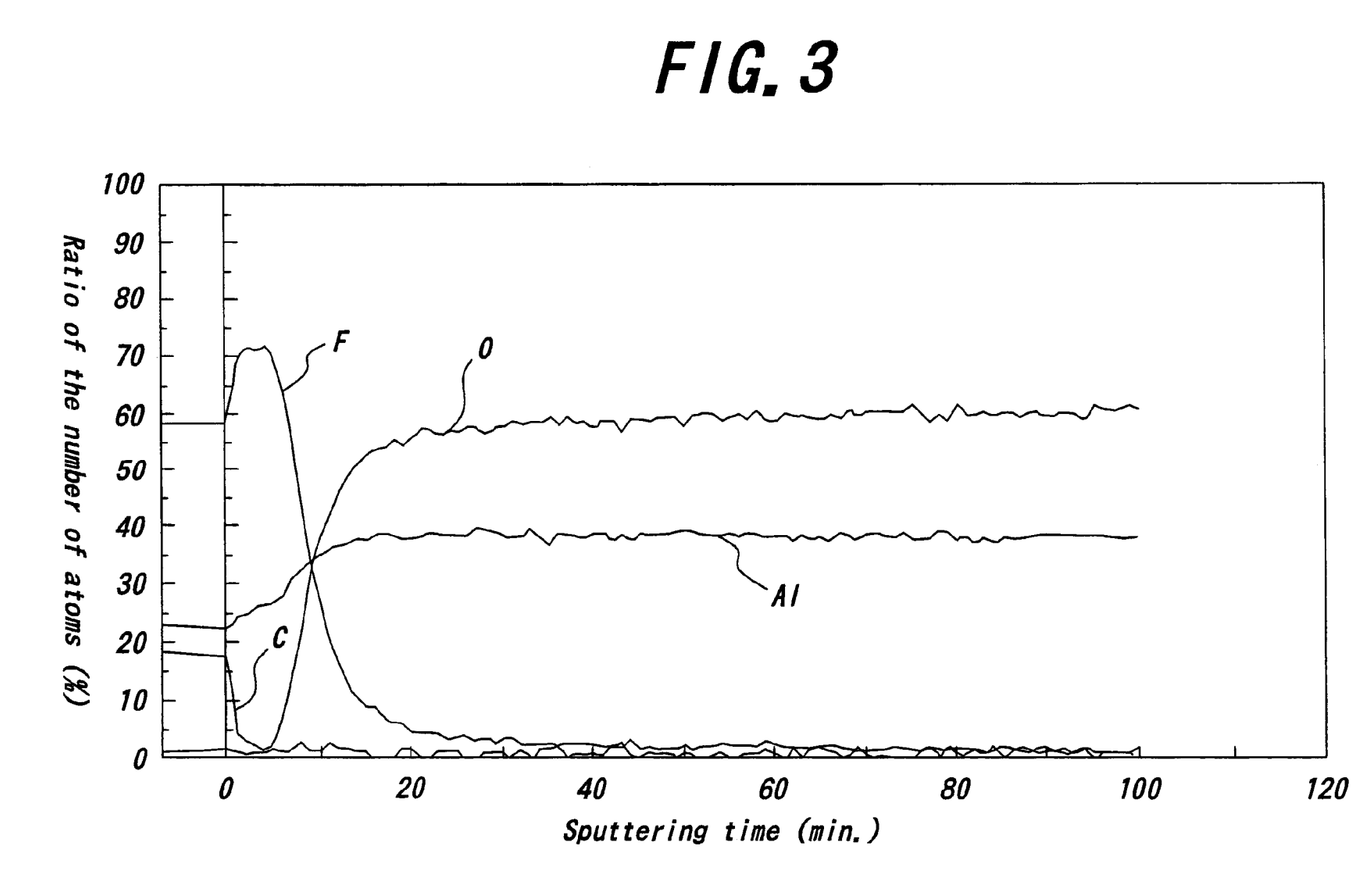
FIG. 3 is a chart showing a Depth profile obtained by the XPS on the surface of the specimen in Example 1 according to the present invention and an ordinate axis is a ratio of the number of atoms.
Figure 4:
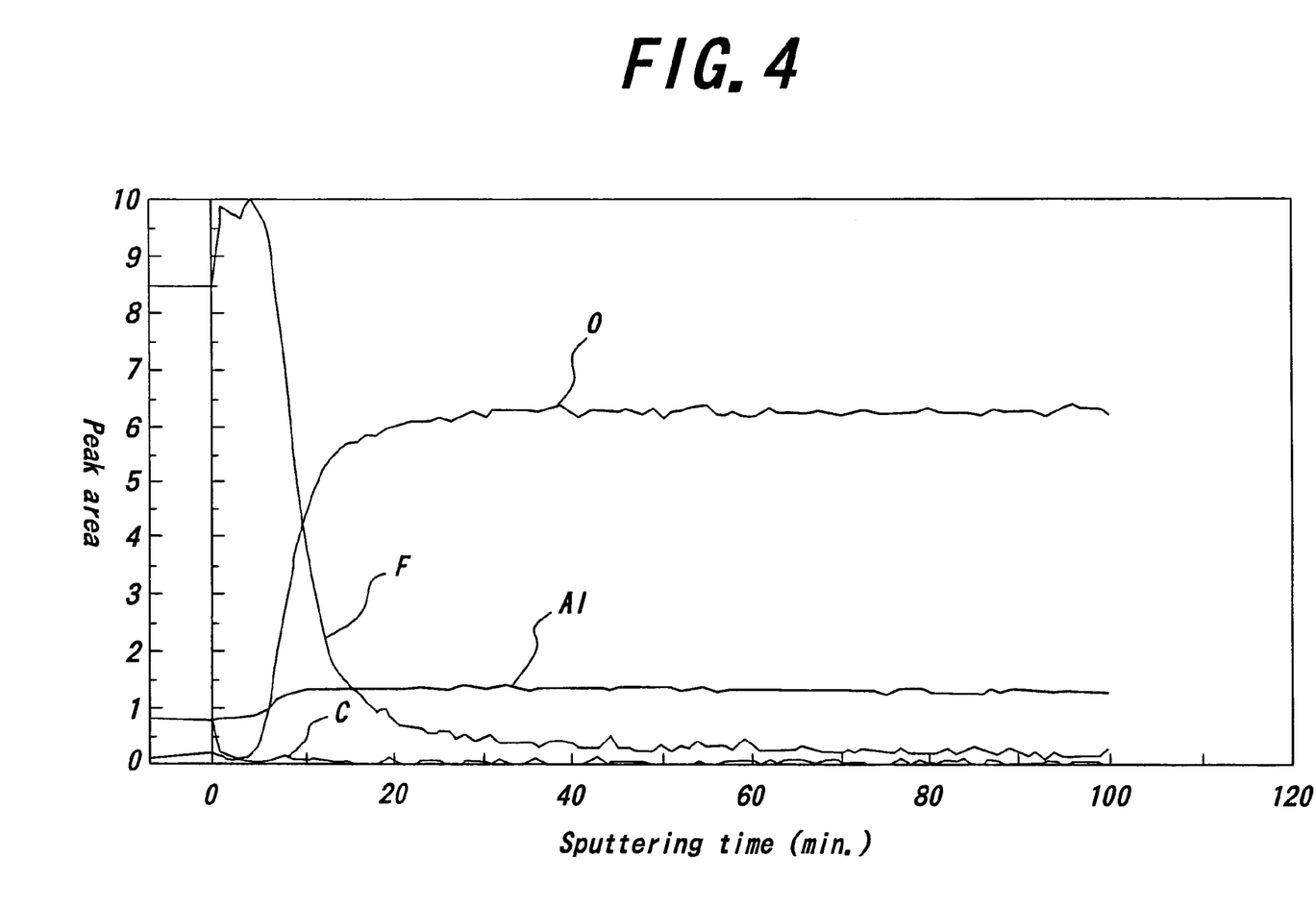
FIG. 4 is a chart showing a Depth profile obtained by the XPS on the surface of the specimen in Example 1 according to the present invention and an ordinate axis is a peak area (an observed signal strength) of each atom.

FIGS. 3 and 4 respectively show Depth profiles (a profile of the specimen in a depth direction) obtained by the XPS on the specimen. Measuring conditions in the XPS is shown below. A used machine is "ESCA-5700ci" made by Physical Electronics Co., Ltd., which gives information as a mean value in a circle having a 0.8 mm diameter as viewed in plane and in a depth of about 100 angstrom. The information at certain depth is obtained while the specimen is dug from the surface in the depth direction by sputtering. In the sputtering an argon ion beam (3 kV) was used and a sputtering rate was 3.93 nm/mm (silicon dioxide).

In the FIG. 3 an ordinate axis is a ratio of the number of atoms F, O, Al, and C and an abscissa axis is a sputtering time (min). The length of sputtering time corresponds to the depth from the surface of the specimen. The sputtering time was limited to 100 min. In the FIG. 4 an ordinate axis is a peak area of F, O, Al, or C (an observed signal strength) and an abscissa axis is a sputtering time (min). The length of sputtering time corresponds to the depth from the surface of the specimen.

As seen from the FIGS. 3 and 4, the peak of F exists near to the surface of the specimen and as the detection line goes from the peak of F toward its right side, the amount of F rapidly decreases and it is replaced with oxygen.

In the FIG. 4 a distance from the surface of the specimen to a position where the peak strength of F becomes half was assumed to be the thickness of the film. An absolute of the depth can not seen from the measurement by means of the XPS. Therefore, the sputtering depth from the surface of the specimen after a sputtering time of 100 min was measured by a three-dimensional measuring device. Consequently, a distance from the surface of the specimen to a position where the peak strength of F becomes half was 0.1 μm.

Further, with respect to the specimen a reduction in weight due to corrosion and an amount of the generated particles were measured. Concretely, $NF_3$ gas and $N_2$ gas were flown at rates of 75 sccm and 100 sccm, respectively to obtain a mixed atmosphere at 0.1 torr. And then the mixed atmosphere was excited by means of an inductively coupled plasma at 13.56 MHz and 800 W to obtain a fluorine gas plasma. Subsequently, in the plasma the specimen was kept for 5 hours at 550° C. to measure the reduction in weight regarded as "reduction in weight due to corrosion". The smaller the reduced amount in weight due to corrosion, the higher its corrosion resistance.

After the specimen was exposed to the fluorine gas plasma, the specimen was pressed with a mirror-finished face of a silicon wafer at 50 gf/cm². Next, the specimen was separated from the silicon wafer and then the number of the particles attached to the mirror face was counted by means of a particle counter commonly used in a semiconductor manufacturing plant.

From the results, the reduction in weight due to corrosion was 0.1 mg/cm² and the number of particles was 4/cm².

EXAMPLE 2

A specimen was produced in the same manner as Example 1 except that the treatment is conducted in 100% of the $F_2$ gas at 450° C. for 60 hours, and analyzed. The results of the scanning electron microscope, XPS and Depth profile were approximately similar to the results of Example 1. And the thickness of the fluorine-containing film was estimated to be 5.0 μm.

From the results, the reduction in weight due to corrosion was less than 0.1 mg/cm² and the number of particles was 5/cm².

EXAMPLE 3

A specimen was produced in the same manner as Example 1 except that the treatment was conducted in a mixing gas of 60% of the $F_2$ gas and 40% of the $N_2$ gas at the whole pressure of 1 atm for 120 hours, and analyzed. The results of the scanning electron microscope, XPS and Depth profile were approximately similar to the results of Example 1. And the thickness of the fluorine-containing film was estimated to be 0.1 μm.

From the results, the reduction in weight due to corrosion was less than 0.2 mg/cm² and the number of particles was 5/cm².

Comparative Example 1

A specimen was produced in the same manner as Example 1 except that the treatment was conducted in a mixed gas of 100% of the $F_2$ gas at 500° C. for 60 hours, and analyzed. The results of the scanning electron microscope, XPS and Depth profile were approximately similar to the results of Example 1. And the thickness of the fluorine-containing film was estimated to be 10.0 μm.

From the results, the reduction in weight due to corrosion was less than 0.1 mg/cm² and the number of particles was 21/cm².

Comparative Example 2

An alumina sintered body having a nominal purity of 99% used for manufacturing a semiconductor which was commercially available was used. An amount of silicon in the sintered body was 0.9% by weight as silicon dioxide. From the sintered body a specimen having a size of 10 mm×10 mm×2 mm was produced. A side of the specimen was mirror-finished to the Ra of about 0.02 μm for the following analysis. This specimen was subjected to the same treatment as Example 1 and tested.

A surface of the obtained specimen had a relatively rough appearance. The results of observation by the EDS attached to the scanning electron microscope were the same as those of Example 1. Further, the state spectrum of $Al_{2p}$ was observed by XPS. From the result of peak shift, Al appears to exist in the form of not oxide but fluoride. The thickness of the film is estimated to be 0.2 μm.

From the results, the reduction in weight due to corrosion was less than 1.3 mg/cm$^2$ and the number of particles was 75/cm$^2$.

Comparative Example 3

An alumina sintered body having a nominal purity of 92% used for manufacturing a semiconductor was used which was commercially available. The amount of silicon in the sintered body was 5.7% by weight when calculated as silicon dioxide. A specimen having a size of 10 mm×10 mm×2 mm was produced from the sintered body. A side of the specimen was mirror-finished to the Ra of about 0.02 μm for the following analysis. This specimen was subjected to the same treatment as Example 1 and tested.

A surface of the obtained specimen was very rough and many cavities could be observed. Since a fluorine-containing film was not formed, the reduction in weight due to corrosion and the number of particles were not measured.

EXAMPLE 4

A kind of yttria aluminate or $Y_3Al_5O_{12}$ was obtained by mixing yttria and alumina in appropriate contents, adding a small amount of silica gel as sintering aid thereto to obtain a mixing powder and sintering the obtained mixing powder. The amount of silicon in the sintered body was 4500 ppm (0.45% by weight) when calculated as silicon dioxide. A specimen having a size of 10 mm×10 mm×2 mm was produced from the sintered body. A side of the specimen was mirror-finished to the Ra of about 0.02 μm for the following analysis. This specimen was subjected to the same treatment as Example 1 except that the treatment was conducted in 100% of the $F_2$ gas at 350° C. at 1 atm for 10 hours and tested.

With respect to the obtained specimen the results of the scanning electron microscope and the EDS attached thereto were the same as those of Example 1. Further, by means of the XPS the state spectra of $Al_{2p}$ and Y were observed. From the results of the peak shift, both Al and Y exist in the form of not oxide but fluoride. Namely, it is considered that $AlF_3$ and $YF_3$ exist in the form of mixture. The thickness of the film was estimated to be 0.2 μm.

From the results, the reduction in weight due to corrosion was less than 0.1 mg/cm$^2$ and the number of particles was 4/cm$^2$.

EXAMPLE 5

A magnesia sintered body containing silicon of 0.3% by weight as silicon dioxide was produced. A specimen having a size of 10 mm×10 mm×2 mm was produced from the sintered body. A side of the specimen was mirror-finished to the Ra of about 0.02 μm for the following analysis. This specimen was subjected to the same treatment as Example 1 except that the treatment was conducted in 100% of the $F_2$ gas at 400° C. at 1.5 atm for 6 hours and tested.

With respect to the obtained specimen the results of the scanning electron microscope and the EDS attached thereto were the same as those of Example 1. Further, by means of the XPS the chemical state spectrum of Mg was observed. From the results of the peak shift, it is considered that Mg exists in the form of not oxide but fluoride. The thickness of the film was estimated to be 1.0 μm.

From the results, the reduction in weight due to corrosion was less than 0.1 mg/cm$^2$ and the number of particles was 6/cm$^2$.

EXAMPLE 6

An aluminum nitride sintered body was obtained by adding yttria as the sintering aid in an amount of 0.1% by weight to aluminum nitride powder having a high purity and sintering the mixture. The amount of silicon in the sintered body was 50 ppm when calculated as silicon dioxide. From the sintered body a specimen having a size of 10 mm×10 mm×2 mm was produced. A side of the specimen was mirror-finished to the Ra of about 0.04 μm for the following analysis. This specimen was subjected to the same treatment as Example 1 and tested.

With respect to the obtained specimen the results of the scanning electron microscope and the EDS attached thereto were the same as those of Example 1. Further, by means of the XPS the state spectrum of $Al_{2p}$ was observed. From the results of the peak shift, it is considered that Al exists in the form of not nitride but fluoride. The thickness of the film was estimated to be 0.1 μm.

From the results, the reduction in weight due to corrosion was less than 0.1 mg/cm$^2$ and the number of particles was 7/cm$^2$.

Comparative Example 4

A silicon nitride sintered body was obtained by adding yttria and magnesia as the sintering aids in an appropriate amount to silicon nitride powder. From the sintered body a specimen having a size of 10 mm×10 mm×2 mm was produced. A side of the specimen was mirror-finished to the Ra of about 0.02 μm for the following analysis.

When this specimen was subjected to the same treatment as Example 1, the specimen volatilized and disappeared.

Comparative Example 5

A silicon carbide sintered body was obtained by adding boron and carbon as the sintering aids in an appropriate amount to silicon carbide powder. From the sintered body a specimen having a size of 10 mm×10 mm×2 mm was produced. A side of the specimen was mirror-finished to the Ra of about 0.02 μm for the following analysis.

When this specimen was subjected to the same treatment as Example 1, the specimen volatilized and disappeared.

As explained above, the corrosion-resistant member comprising the ceramic substrate and the fluorine-containing film which coats at least a part of the surface of the substrate according to the present invention can lead to a decrease of the change in weight due to corrosion and at the same time further control of the amount of generated particles.

What is claimed is:

1. A corrosion-resistant member comprising a substrate made of an aluminum-containing ceramic material and an aluminum fluorine-containing film which coats at least a part of a surface of the substrate, wherein the aluminum fluorine-containing film is formed by directly contacting the substrate with a fluorine-containing compound and has a thickness of 0.01–5.0 μm, and the substrate contains silicon in an amount of not more than 0.5% by weight when calculated as silicon dioxide.

2. A corrosion-resistant member according to claim 1, wherein the ceramic material is alumina or aluminum nitride and the aluminum fluorine-containing film contains a main crystal phase of aluminum fluoride.

3. A corrosion-resistant member according to claim 2, wherein the fluorine-containing compound contains a fluorine gas and the fluorine-containing film is formed by heat-treating the substrate in an atmosphere which contains not less than 60% by volume of the fluorine gas.

4. A corrosion-resistant member according to claim 1, wherein the fluorine-containing compound contains a fluorine gas and the aluminum fluorine-containing film is formed by heat-treating the substrate in an atmosphere which contains not less than 60% by volume of the fluorine gas.

5. A corrosion-resistant member according to claim 4, wherein the atmosphere substantially consists of the fluorine gas.

* * * * *